United States Patent [19]
Reddersen et al.

[11] Patent Number: 5,905,249
[45] Date of Patent: *May 18, 1999

[54] MULTIPLE-INTERFACE SELECTION SYSTEM FOR COMPUTER PERIPHERALS

[75] Inventors: Brad R. Reddersen; Phillip W. Shepard; Rockie D. Moch, all of Eugene, Oreg.

[73] Assignee: Spectra-Physics Scanning Systems, Inc., Eugene, Oreg.

[*] Notice: This patent is subject to a terminal disclaimer.

[21] Appl. No.: 08/955,864

[22] Filed: Oct. 21, 1997

Related U.S. Application Data

[63] Continuation of application No. 08/706,736, Sep. 9, 1996, Pat. No. 5,703,347, which is a continuation of application No. 08/305,517, Sep. 13, 1994, Pat. No. 5,563,402, which is a continuation-in-part of application No. 08/039,606, Mar. 19, 1993, Pat. No. 5,347,113, which is a continuation-in-part of application No. 08/034,189, Mar. 19, 1993, Pat. No. 5,330,370, which is a continuation of application No. 07/788,267, Nov. 19, 1991, abandoned.

[51] Int. Cl.$^6$ .................................................. G06K 7/10
[52] U.S. Cl. .............................. 235/462.15; 235/462.13; 235/462.43
[58] Field of Search .................... 235/462, 472, 235/462.15, 462.13, 462.43, 462.45, 462.47; 439/502, 620

[56] References Cited

U.S. PATENT DOCUMENTS

| | | |
|---|---|---|
| 4,543,450 | 9/1985 | Brandt ........................ 179/2 C |
| 4,579,407 | 4/1986 | Shimada ..................... 439/620 |
| 4,678,288 | 7/1987 | Lonsdale et al. ............ 350/432 |
| 4,686,506 | 8/1987 | Farago ........................ 340/347 |
| 4,694,182 | 9/1987 | Howard ....................... 250/566 |
| 4,699,447 | 10/1987 | Howard ....................... 350/6.9 |
| 4,820,193 | 4/1989 | Noorily ....................... 439/488 |
| 4,861,972 | 8/1989 | Elliott et al. ................. 235/472 |
| 4,866,257 | 9/1989 | Elliott et al. ................. 235/436 |
| 4,868,375 | 9/1989 | Blanford .................... 235/462 |
| 4,889,497 | 12/1989 | Riches ......................... 439/76 |
| 4,902,244 | 2/1990 | Endo et al. .................. 439/488 |
| 4,915,639 | 4/1990 | Cohn et al. .................. 439/488 |
| 4,941,845 | 7/1990 | Eppley et al. ............... 439/505 |
| 4,954,101 | 9/1990 | Nelson ......................... 439/502 |
| 4,972,470 | 11/1990 | Farago .................... 340/347 DD |
| 5,040,993 | 8/1991 | Krug et al. .................. 439/620 |
| 5,092,793 | 3/1992 | Stephan ....................... 439/446 |
| 5,181,858 | 1/1993 | Matz et al. .................. 439/489 |
| 5,200,597 | 4/1993 | Eastman et al. ............. 235/455 |
| 5,214,268 | 5/1993 | Doing .......................... 235/462 |
| 5,222,164 | 6/1993 | Bass, Sr. et al. ............ 438/488 |
| 5,250,792 | 10/1993 | Swartz et al. ............... 235/472 |
| 5,330,370 | 7/1994 | Reddersen et al. ......... 439/502 |
| 5,347,113 | 9/1994 | Reddersen et al. ......... 235/462 |
| 5,563,402 | 10/1996 | Reddersen et al. ......... 235/436 |
| 5,664,229 | 9/1997 | Bhargava et al. ........... 395/885 |
| 5,675,139 | 10/1997 | Fama .......................... 235/472 |
| 5,703,347 | 12/1997 | Reddersen et al. ......... 235/472 |

*Primary Examiner*—Donald Hajec
*Assistant Examiner*—Karl D. Frech
*Attorney, Agent, or Firm*—Lyon & Lyon LLP

[57] ABSTRACT

An interface selection and configuration system for a computer peripheral in which configuration for the peripheral and/or the host interface is at least in part accomplished by the interface connector cable. In a preferred embodiment, the computer peripheral is equipped with one or more hardware interfaces. The interface connector cable has a first end connector for attaching to the computer peripheral. The first end connector of the interface connector cable is typically a multiple pin connector constructed and arranged to be properly physically and electrically connectable only to a specific computer peripheral or class of computer peripherals, the first end connector including at least one electrical connection between two pins for completing a circuit within the computer peripheral thereby enabling the computer peripheral. Where the peripheral is a data reading device such as a laser scanner or RFID reader, alternate or additional configuration may be obtained, with data reading device, from the label on the interconnect cable. The label, which may for example be a bar code or RFID tag, contains information or instructions by which the data reading device (and/or the host) is configured.

76 Claims, 5 Drawing Sheets

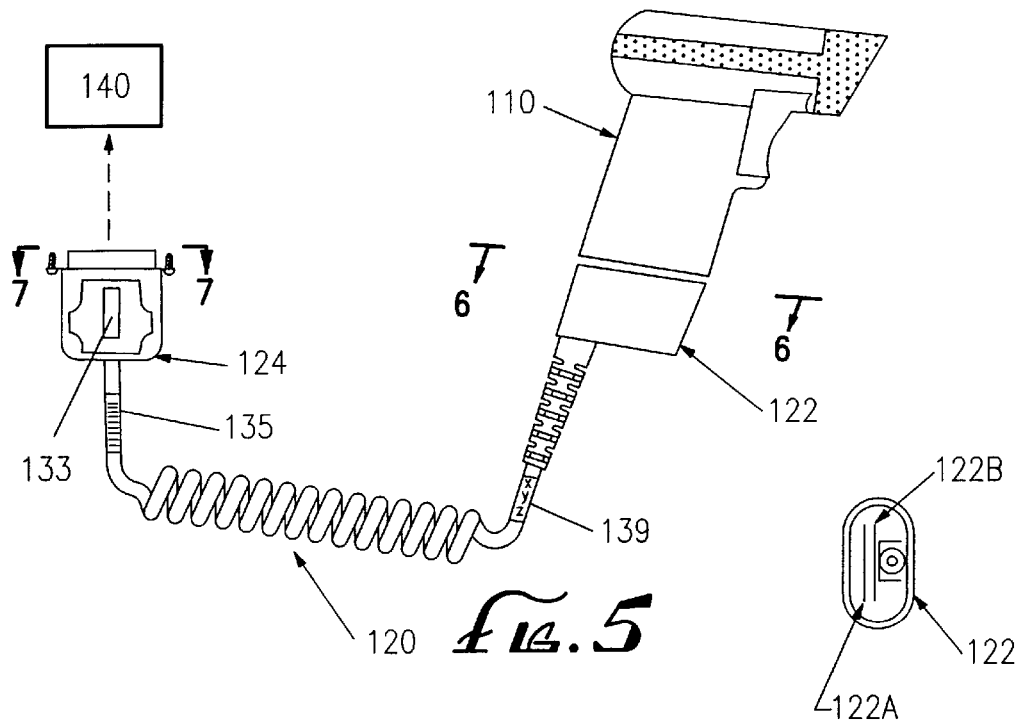
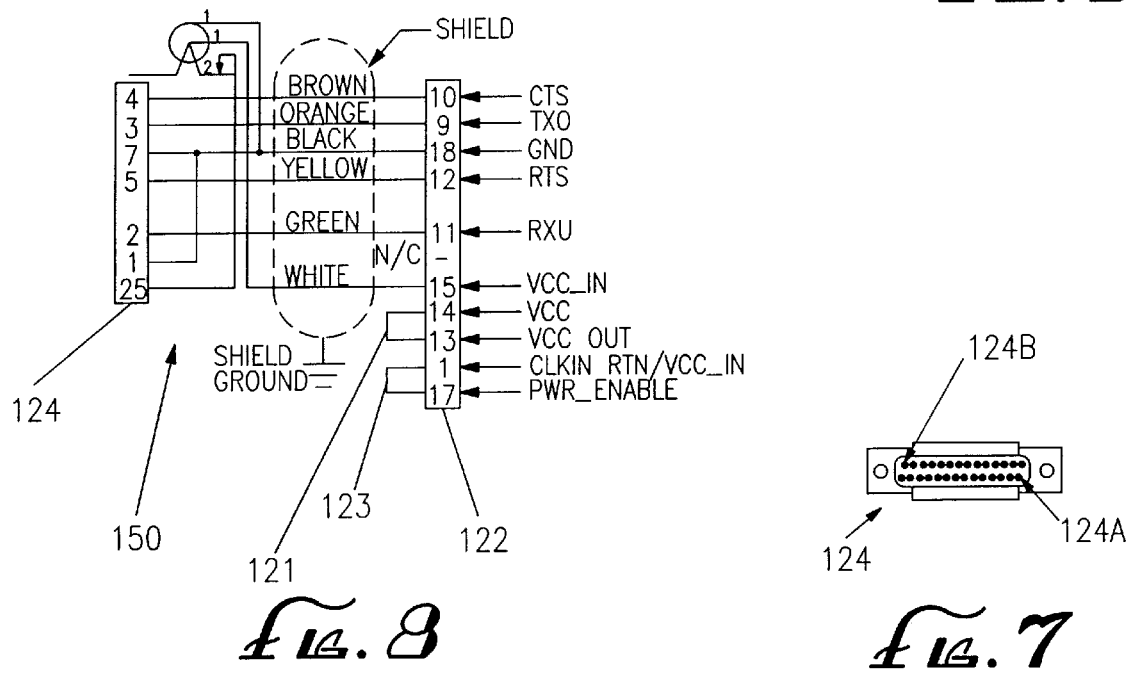

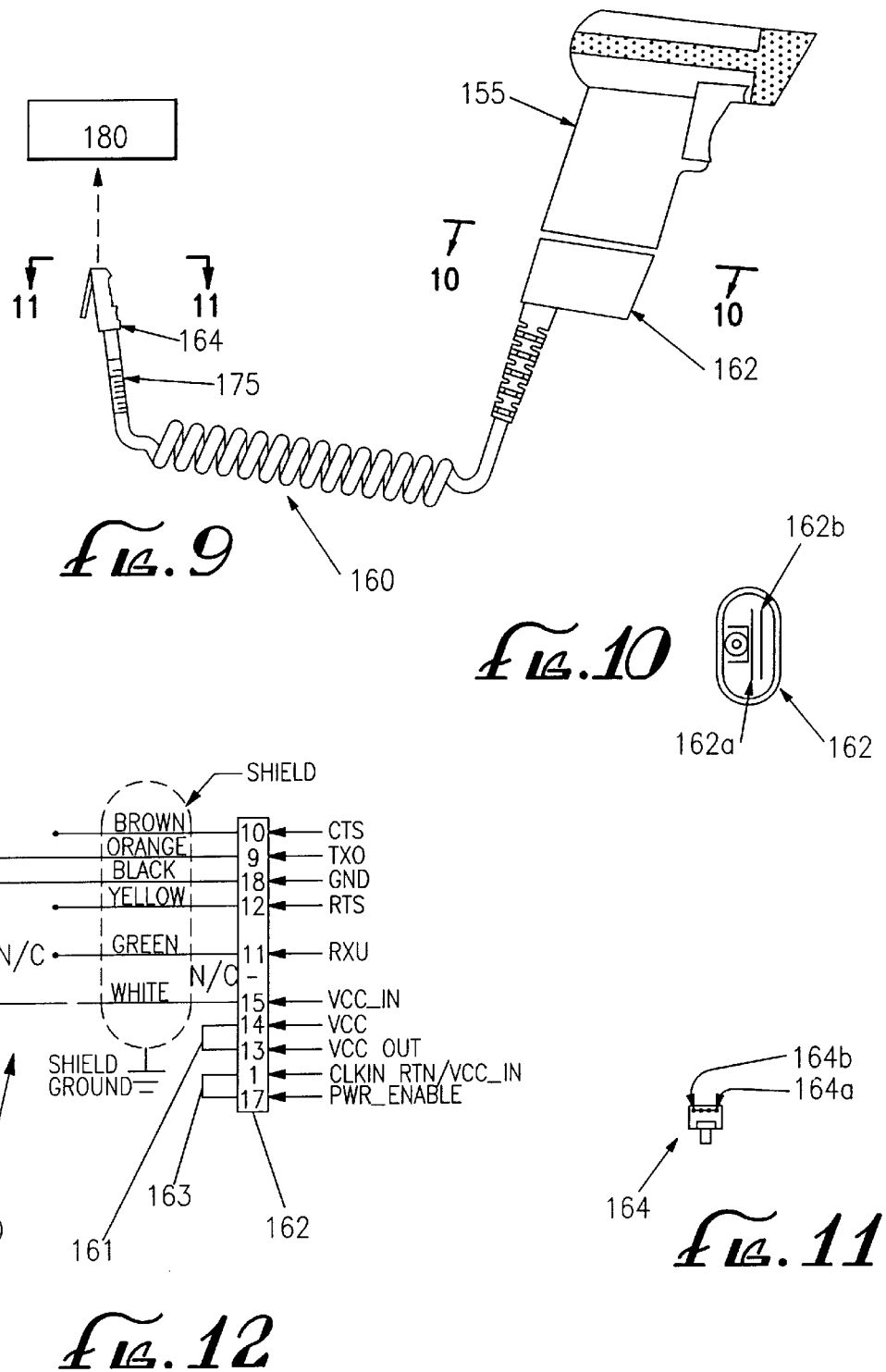

MULTIPLE-INTERFACE SELECTION SYSTEM FOR COMPUTER PERIPHERALS

RELATED APPLICATIONS

This application is a continuation of Ser. No. 08/706,736, filed Sep. 9, 1996, now U.S. Pat. No. 5,703,347 which is a continuation of Ser. No. 08/305,517, filed Sep. 13, 1994, now U.S. Pat. No. 5,563,402, which is a continuation-in-part of application Ser. No. 08/039,606, filed Mar. 25, 1993, now U.S. Pat. No. 5,347,113, which is a continuation-in-part of application Ser. No. 08/034,189 filed Mar. 22, 1993, now U.S. Pat. No. 5,330,370, which is a continuation of application Ser. No. 07/788,267 filed Nov. 4, 1991, abandoned.

BACKGROUND OF THE INVENTION

The field of the present invention relates to interconnection systems for computers and computer peripherals or more specifically, methods and devices for selecting proper interface between a computer peripheral and its host interface such as may include a computer.

Host computers need to be interconnected to a wide variety of peripheral devices including printers, scanners, monitors, and controllers among others. When the host computer is being connected to a certain type of peripheral, for example a handheld laser scanner, the computer typically has a single input/output connector to which the scanner may be connected by an interconnect cable. It is frequently desirable that a particular handheld scanner be usable with a variety of different host computers. Conversely, it is also desirable that the host computer be able to support a variety of different handheld scanners.

Heretofore there have been several systems for achieving proper configuration between the host computer and the peripheral. In a typical system, a particular peripheral is configured to work with a particular host computer or terminal, that is, the peripheral has contained a single dedicated interface. Similarly, the host computer was configured to accept only a particular type of peripheral. Any time the peripheral was moved to a different host computer, it was necessary to replace the interface software and hardware in the peripheral.

The host computer may include a software selection program in which the user inputs information identifying the particular peripheral enabling the system to have proper operation. Such an operation requires the user to correctly input information into the host computer identifying the particular peripheral. Alternately, means are provided for scanning a code on the outside of the peripheral which informs the computer of the type of peripheral. Some peripherals actually include identifying signals which again inform the particular host of the type of peripheral and software provides the desired configuration. Many of these systems still require correct interface hardware.

In another configuration technique, the peripheral includes interface hardware for more than one host computer. When configuring, the printed circuit board of the peripheral requires certain hardware configuration in order to be correctly linked to a host computer. Such hardware configuration may be effectuated by manually actuable external switches or by internal switches or "jumpers" within the printed circuit board (and/or within the host computer) which activate or deactivate certain components. Such an operation typically requires the expertise of an electronics technician or skilled user and is not a desirable field operation to be performed by the typical user. It is desirable to have an inexpensive and easy to use interconnection system which can be effectively used by the average user.

SUMMARY OF THE INVENTION

The present invention relates to an interface selection system for a computer peripheral in which configuration for the peripheral and/or its host is at least in part accomplished through the interface connector cable. In a preferred embodiment, the computer peripheral is equipped with one or more hardware interfaces. The interface connector cable has a first end connector for attaching to the computer peripheral. The first end connector of the interface connector cable is typically a multiple contact connector (such as pin or edge connector) constructed and arranged to be properly physically and electrically connectable only to a specific computer peripheral (or class of computer peripherals), and a specific host interface the cable connector including at least one electrical connection between two contacts for completing a circuit within the computer peripheral thereby enabling the computer peripheral.

In another preferred embodiment where the peripheral is a data reading device such as a laser scanner or an RF identification receiver, alternate or additional configuration may be provided by obtaining, with the data reading device, information from the label on the interconnect cable. The label, which may for example be a bar code, contains information or instructions by which the data reading device (and/or the host) is configured.

BRIEF DESCRIPTION OF THE DRAWINGS

FIG. 5 is a diagrammatic view of an alternate peripheral configuration system;

FIG. 6 is an end view of an end connector in FIG. 5 taken along line 6—6;

FIG. 7 is an end view of an end connector in FIG. 5 taken along line 7—7;

FIG. 8 is a connector schematic illustrating an example cable connection scheme for the cable connector of FIG. 5;

FIG. 9 is a diagrammatic view of an alternate peripheral configuration system;

FIG. 10 is an end view of an end connector in FIG. 9 taken along line 10—10;

FIG. 11 is an end view of an end connector in FIG. 9 taken along line 11—11;

FIG. 12 is a connector schematic illustrating an example cable connection scheme for the cable connector of FIG. 9;

DESCRIPTION OF THE PREFERRED EMBODIMENTS

The preferred embodiments will now be described with reference to the drawings.

Figure 1:
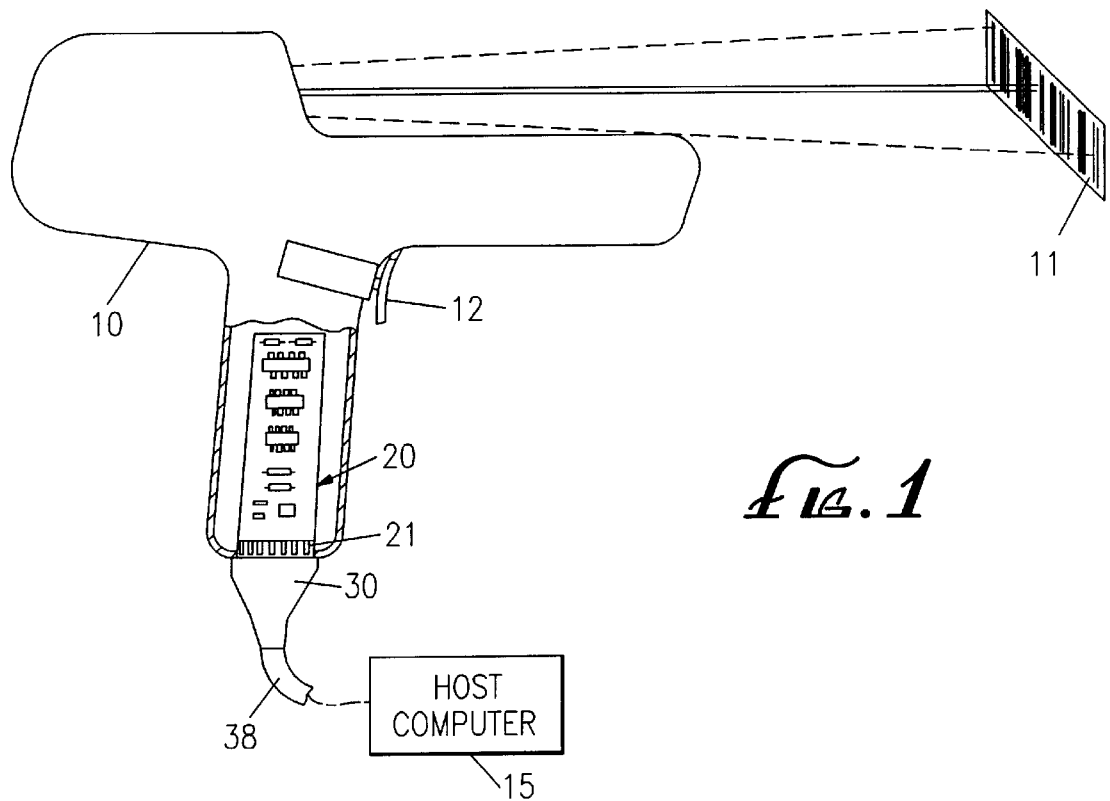
FIG. 1 is a diagrammatic view of a handheld laser scanner attached to a host computer according to the present invention.

In FIG. 1, an example computer peripheral is illustrated as a handheld laser scanner 10 used for scanning a bar code 11.

The scanner 10 is operably connected to a host interface (diagrammatically illustrated as a computer 15) via an interconnect cable 38. The interconnect cable 38 includes an end plug or edge connector 30 which connects to a mating connector 21 on the end of a printed circuit board 20 within the scanner 10. The interconnect cable 38 provides a communication link between the host computer 15 and the laser scanner 10 and may also provide power to the scanner 10.

Figure 2:
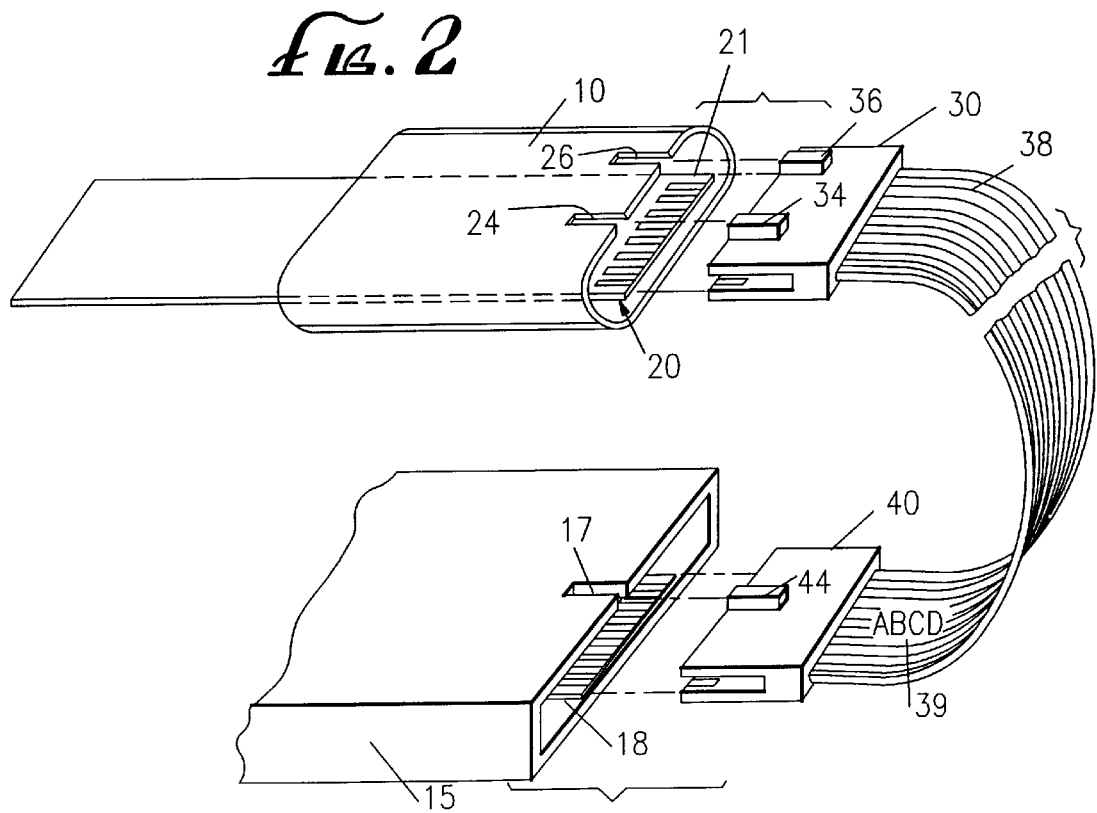
FIG. 2 is a diagrammatic view of an interface connector system according to the present invention.

Referring to FIG. 2, the interconnect cable 38 has a first end connector 30 which plugs into the scanner 10 attaching to the edge connector 21 of the circuit board 20, and a second end connector 40 which plugs into the host computer 15 attaching to the edge connector 18. The first end connector 30 includes tabs 34, 36 which slide into and mate with corresponding slots 24, 26 in the body of the handle of the scanner 10. Different types of scanners may be equipped with different positions of the slots 24, 26. Only an end connector 30 having the correct configuration of tabs 34, 36 will be correctly physically connectable to the scanner 10. An interconnect cable 38 without the correct tab configuration cannot physically be plugged into the scanner 10.

Similarly on the host computer side of the interconnect cable 38, the second end connector 40 is equipped with a tab 44 which mates with a corresponding slot 17 at the mating edge connector 18 of the host computer 15. Only an end connector 40 having the correct configuration of the tab 44 will be correctly physically connectable to the host computer 15. An interconnect cable 38 without the correct tab configuration cannot physically be plugged into the host computer 10.

Therefore in order to connect a particular peripheral (such as a laser scanner 10) to a particular host computer, a cable having the correct tab configurations at both end connectors must be selected. The unique physical configurations ensures that the user must select the correct cable for the host computer and peripheral pair. The preferred embodiment may only require tab configuration on the host computer end because it is not anticipated that the various handheld scanners will require the dedicated interconnect cables, but tab configurations on the peripheral end may be desired in other peripheral applications. Further, the tab configurations illustrated are but one example means for ensuring proper interconnect cable selection. The tabs and slots are readily added to conventional end connectors. The design illustrated does not prevent end connectors without tabs from connecting to the peripheral 10 and the host computer 15, but such design may be modified by one skilled in the art (such as by reversing the positions of the slots/tabs) to prevent such connection.

Figure 3:
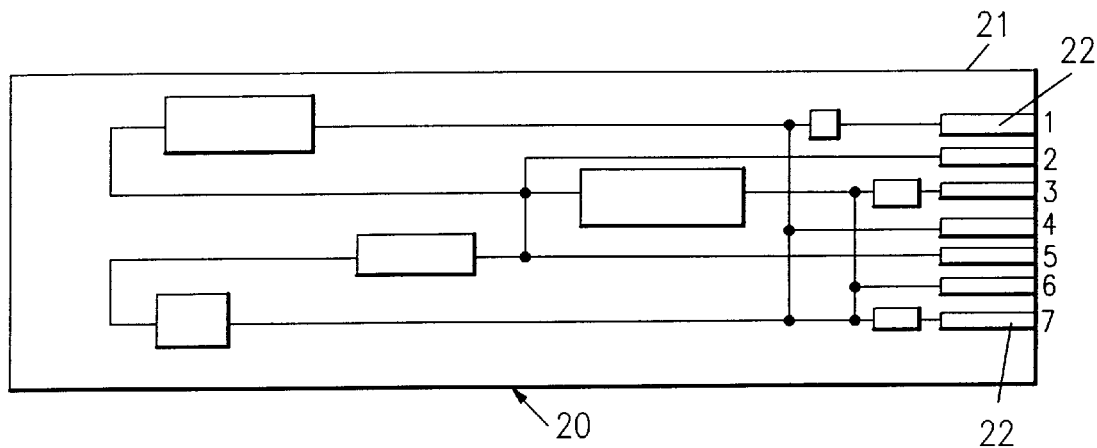
FIG. 3 is a detailed diagrammatic view of a printed circuit board of FIG. 2.
Figure 4:
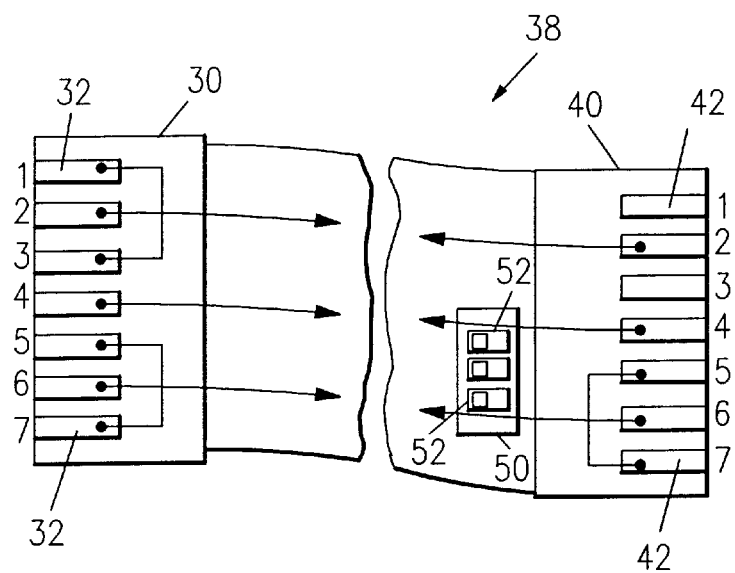
FIG. 4 is a detailed diagrammatic view of an edge connector as in FIG. 2.

Referring to FIGS. 3 and 4, the printed circuit board 20 (located within the scanner 10) includes an edge connector 21 shown with seven edge contacts 22 (numbered 1 through 7). Though there is a distinction between edge contacts and pins, for the purposes of the present invention, they are interchangeable—a pin connector with its mating plug connector may be interchanged for an edge connector pair or any other suitable electrical contact pair.

The board 20 is designed and constructed to be operable with a number of host computers by way of an externally activated hardware configuration provided by the interconnect cable 38. As viewed in FIG. 4, in the edge connector 30, the edge contacts #5 and #7 are electrically connected, illustrated as being "jumped". Edge contacts #1 and #3 are also jumped while edge contacts #2, #4 and #6 are used for communication. When the interconnect cable 38 is plugged into the printed circuit board 20, edge 20 contacts #1 and #3 of the edge connector 21 are thereby electrically connected, and edge contacts #5 and #7 are also electrically connected. By so electrically connecting these electrical contacts, certain circuits within the circuit board 20 become electrically connected resulting in a desired configuration. The scanner 10 becomes configured to accept a particular host computer 15. The user has configured the scanner merely by plugging in the correct interconnect cable 38.

A similar configuration selection system may alternately or in combination be applied to the host computer connection side. The edge connector 40 has certain of its edge contacts 42 electrically connected, in the illustrated example pins #5 and #7 of the edge connector 40 are jumped. When the edge connector 40 is plugged into the edge connector 18 of host computer 15, edge contacts #5 and #7 within the edge connector 18 become electrically connected, completing a circuit within the host computer 15, thereby configuring the host computer 15 for the particular peripheral. The user may therefore configure the host computer 15 for the particular scanner 10 by merely selecting and plugging in the correct interconnect cable 38.

In practice, the user would be provided with a single peripheral, such as a scanner and several interconnect cables. To connect the scanner, the user would merely select the interconnect cable corresponding to the particular host computer and plug it into the scanner. The interconnect cable would then configure the scanner for the particular host computer. To move the scanner to a different host computer, the user would merely have to switch cables. The interconnect cable 38 may be provided with means for identifying such as identifying markings 39 imprinted directly on the interconnect cable 38 itself, color coding, a label with identification information connected to the cable 38, or the like to assist the user in selecting the correct interconnect cable for the given host.

The illustrated seven edge connector embodiment is a simplified example for a connector design. Electrical contact configurations may of course be more or less than seven contacts (and the two ends need not be the same). In a preferred scanner application, an interconnect cable plug with 30 pins is set forth in Table A as follows:

TABLE A

| Pin # | Signal Name | Data Direction (s) |
|---|---|---|
| 1 | TEST_DATA | <- - - - -> |
| 2 | READ_DATA_WAND | - - - - -> |
| 3 | START_DATA | <- - - - - |
| 4 | CLOCKIN | <- - - - - |
| 5 | CLOCKOUT | <- - - - - |
| 6 | RDATA_RTN | - - - - -> |
| 7 | SDATA_RTN | <- - - - - |
| 8 | CLOCK_OUT_RTN | <- - - - - |
| 9 | CLOCK_OUT_RTN | <- - - - - |
| 10 | VCC | <- - - - - |
| 11 | VCC_OUT | - - - - -> |
| 12 | VCC_IN | <- - - - - |
| 13 | CLEAR_TO_SEND | |
| 14 | TRANSMIT_DATA | |
| 15 | RETURN_DATA | |
| 16 | RETURN_S | |
| 17 | DATA_PLUS | |
| 18 | DATA-MINUS | |
| 19 | BEEP_IN | |
| 20 | PWR_EN | |
| 21 | TRIGGER | |
| 22 | BAR_CODE_OUT | |
| 23 | GOOD_READ_IN | |
| 24 | START_OF_SCAN | |
| 25 | MTR_FAIL | |

TABLE A-continued

| Pin # | Signal Name | Data Direction (s) |
|---|---|---|
| 26 | GROUND | |
| 27 | CONFIG_1 | |
| 28 | CONFIG_2 | |
| 29 | CONFIG_3 | |
| 30 | CONFIG_4 | |

The interconnect cable plug may use certain of the pins for communication or power. Some of the pins may be unused and available for other applications, it being desirable that the same pin design be usable for different configurations. The last four pins #27–#30 are dedicated for providing the configuration for the peripheral. The variations of configurations are limitless and may be designed to suit a particular application. The example in Table A is provided in part to show the wide variety of configurations that may be employed. By the cable configuration scheme, the peripheral may be configured setting for example communication baud rate, bit setting (8-bit, 16-bit etc.), parity or some other parameter.

Though particular types of end connectors have been described, the pin connector may be any suitable electrical connector means for providing electrical contact including plugs, pin connectors, sockets, edge connectors and the like. The end connector has multiple contacts, the contacts providing the actual electrical contact surface. The contacts may be pins, edge contacts, plugs, sockets, or any suitable electrical contact element.

The center of the interconnect cable 38 may comprise any suitable transmission medium including a wire (as illustrated), cable, fiber optic cable, radio frequency link, infra red light link, or other transmission medium.

The cable configuration system described may be combined with other configuration systems, some of which have been previously described. For example, the interconnect cable system described herein may be used to automatically select a configuration for a certain class or group of peripherals. The peripheral may additionally include external (or internal) switches identifying the particular peripheral within the group thereby completing the described configuration.

In practice, a computer peripheral such as a laser scanner 10 will be equipped with hardware and firmware so that it may be used with a plurality of different host computers or computer terminals. To provide initial configuration or change configuration when switching host computers, the peripheral is configured merely by selecting the correct interconnect cable 38. The electrically connected pins in the end connector of the interconnect cable provide the switching necessary within the scanner 10, activating or deactivating certain circuits, thereby configuring the scanner 10 for the particular host computer.

The interconnect cable 38 may be designed in any suitable manner. In FIGS. 3 and 4 illustrate jump connections between the respective edge contacts 32 of edge connector 30 (or edge contacts 42 of edge connector 40), other electrical connection mechanisms may be employed. The contacts may be electrically connected by a simple hard wire connection. The interconnect cable 38 itself may include a printed circuit board 50, preferably in a unitary structure, which may provides the desired electrical connection between the pins. The interconnect cable 38 (or the printed circuit board 50 thereon) may itself be equipped with dip switches 52 (dual inline package switches) or some other type of switch. An interconnect cable equipped with switches would have certain advantages as only one cable version need be manufactured. The cable type corresponding to a particular peripheral would be selected by setting the switches (by the manufacturer or by the skilled user) and the cable could then stamped with an identifying code 39.

As described above, the handheld data reader or other computer peripheral is generally connected by a connector cable to a given host or interface. The host or interface is typically a host computer such as a central processing unit (CPU) or other intermediate device which in turn communicates with the CPU. The host may be a communication module, such as an RF transmitter which is provides a radio frequency communication link to the host computer. In such an application, the cable is nonetheless connected to the host computer or CPU albeit through the communication module. If the peripheral is a printer for example, the host may be a network interface, into which the connector cable is plugged, which is in turn connected to the host computer.

Figure 13:
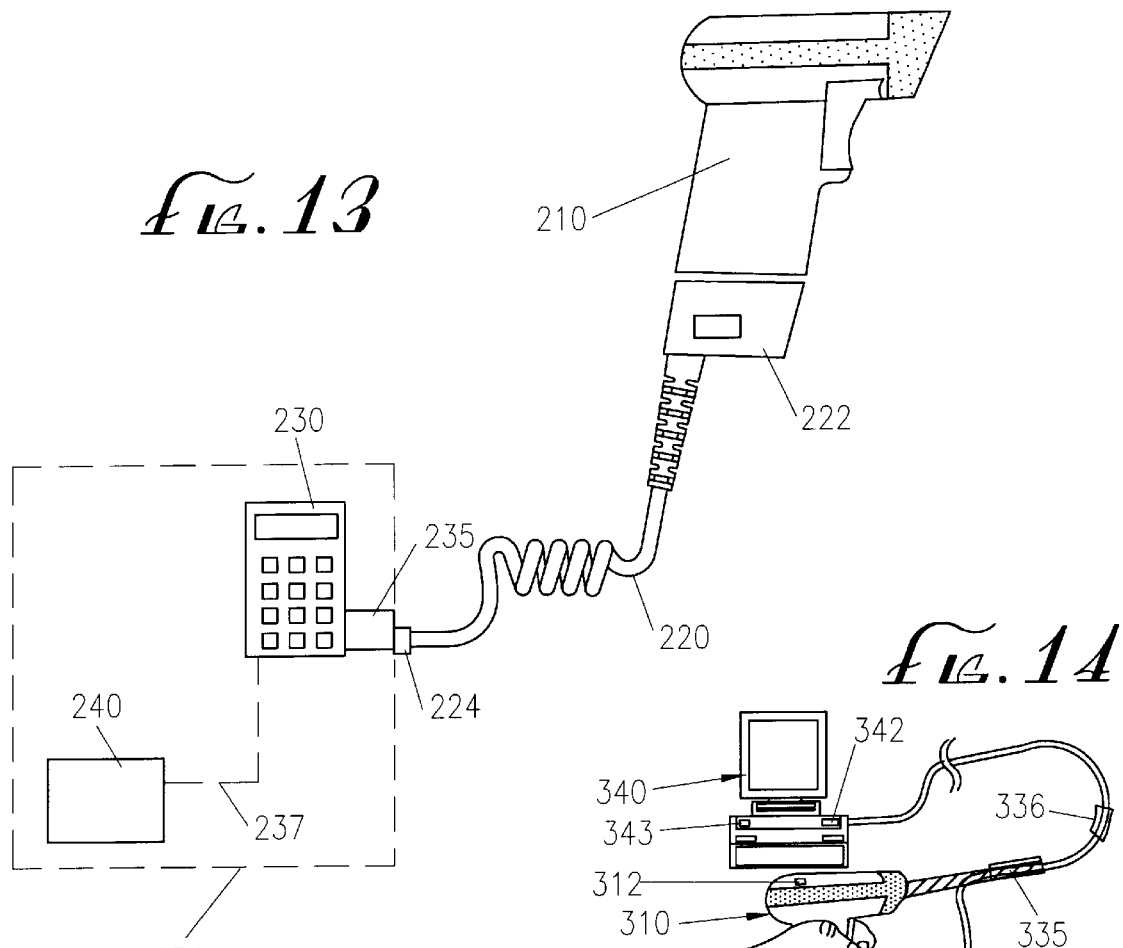
FIG. 13 illustrates an alternate cable connection embodiment.

There are myriad of potential hosts for a given peripheral. By way of another example, FIG. 13 illustrates a system in which a handheld bar code scanner 210 is connected to a key entry terminal 230. The interconnect cable 220 has a first end connector 222 plugged into the handheld bar code scanner 210. The second end connector 224 is actually plugged into a translator module 235 (sometimes called a "wedge") which converts the signal transmitted from the scanner 210 into a signal of the same form as that produced by the key entry terminal 230. The key entry terminal 230 is in turn connected by a suitable communication link 237 to the central processing unit 240. In this arrangement, the host is literally the wedge 240 but may be also be considered to comprise a host assembly contained within the dashed-lined box and designated by numeral 250.

FIGS. 5–8 illustrate a preferred alternate embodiment in which the peripheral is a handheld data reading device 110 such as a bar code laser scanner, a CCD reader or other device. The scanner 110 is attached to a host, diagrammatically illustrated as a data terminal 140, by a connector cable 120 with a first end connector 122 plugged into the scanner 110 and the second end connector 124 plugged into the data terminal 140. The connector cable 120 is provided with a label 135 which contains encoded data which may be read by the data reader 110. The label 135 may, for example, be a separate tag on which the bar code is imprinted or the bar code may be imprinted directly on the cable 120 itself. As described below, the label may also comprise an RFID tag containing the pertinent programming data.

As best shown in FIG. 6, the first end connector 122 is illustrated as an edge connector having a plurality of edge contacts, including contacts 122a, 122b, for connection into a corresponding connector in the handle of the scanner 110. FIGS. 5 and 7 illustrate the second end connector 124 as a pin connector having a plurality of pins (including pins 124a, 124b) for connection into a corresponding connector in the data terminal 140.

The cable 120 may also include an identification label 139 which has identification information to assist the user in selecting the correct cable for the particular scanner and host pair. Other or alternate selection means such as color coding may be provided to assist the user in selecting the correct interconnect cable for the particular application.

FIG. 8 schematically illustrates an example cable connection scheme 150 for the cable connector 120 of FIG. 5. Color coded cable wires (Brown, Orange, Black, Yellow, Green, White) provide desired electrical communication path between edge contacts (nos. 10, 9, 18 etc.) in the first end connector 122 and respective pin contacts (nos. 4, 3, 7 etc) in the second end connector 124. The cable connector 120 also includes peripheral configuration selection by electrical connector 121 (connecting edge contacts 14 and 13) and by electrical connector 123 (connecting edge contacts 1 and 17).

FIGS. 9–12 illustrate another preferred alternate embodiment in which the peripheral is a handheld data reading device 155 such as a bar code laser scanner, a CCD reader or other device. The scanner 155 is attached to a host (diagrammatically illustrated as a data terminal 180) by a connector cable 160 with a first end connector 162 plugged into the scanner 155 and the second end connector 164 plugged into the data terminal 180. The connector cable 160 is provided with a label 175 which contains encoded data which may be read by the data reader 155. The label 175 may, for example, be a separate tag on which a bar code is imprinted or the bar code label may be imprinted directly on the cable 160 itself. As described in detail below, if required, the user may at least partly configure the scanner 155 merely by scanning the bar code label 175. An internal operation routine within the scanner 155 then configures the scanner itself on the basis of the configuration information provided by the bar code.

As best shown in FIG. 10, the first end connector 162 is illustrated as an edge connector having a plurality of edge contacts, including contacts 162*a*, 162*b*, for connection into a corresponding connector in the handle of the scanner 155. FIGS. 9 and 11 illustrate the second end connector 164 as a plug connector (similar to the type conventionally used on home telephones) having a plurality of wire connectors (including wire connectors 164*a*, 164*b*) for connection into a corresponding connector in the data terminal 180.

FIG. 12 schematically illustrates an example cable connection scheme 190 for the cable connector 160 of FIG. 9. Color coded cable wires (Brown, Orange, Black, Yellow, Green, White) provide desired electrical communication path between edge contacts (nos. 10, 9, 18 etc.) in the first end connector 162 and respective contacts (nos. 1, 2, 3, 4) in the second end connector 164. The cable connector 160 also includes peripheral configuration selection by electrical connector 161 (connecting edge contacts 14 and 13) and by electrical connector 163 (connecting edge contacts 1 and 17).

Figure 14:
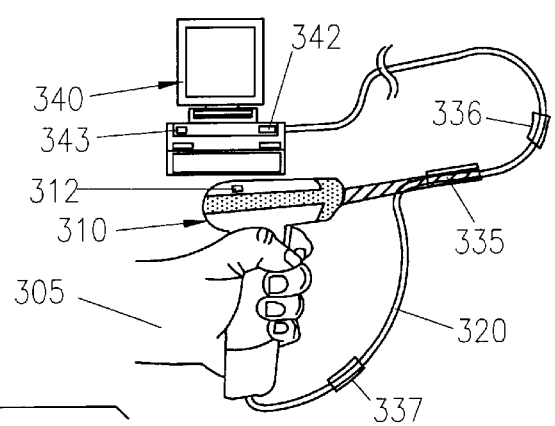
FIG. 14 illustrates a cable scanning code operation.

In the preferred embodiment of the present invention as shown in FIG. 14, the data reader device 310 is further (or alternately) configured by reading a label having encoded data thereon such as a configuration bar code 335 which is placed on the interconnect cable 320. By reading the configuration code 335, the scanner 310 (and/or the host 340) is configured for the particular application on the basis of the encoded instruction data by means of an internal configuration routine within the scanner 310 or the host 340.

U.S. Pat. Nos. 4,866,257 and 4,861,972 (herein incorporated by reference) disclose examples on how a scanner may be configured by scanning a bar code or by downloading information from a host computer. Once the bar code has been scanned or the control information, the configuration information is stored in a memory (preferably a non-volatile memory such as EEPROM) in the scanner so that repetitive configuration is not required and the configuration of the scanner is not lost when power is turned off. Typically, the bar codes are contained in the user manual and the user must obtain the manual and then select the correct bar code to be scanned. However, according to the preferred embodiment shown in FIG. 14, the user 305 need only select the correct interconnect cable 320 and the correct bar code label 335 to be scanned is automatically selected since it is on the cable itself. Moreover, being on the cable, the bar code is readily accessible and locatable without having to locate the user manual. Though once the system has been initially configured, the system will preferably store the configuration information, if it becomes necessary to reconfigure, the configuration bar code 335 remains readily accessible on the cable 320.

In order to ensure that a scanner is not inadvertently reconfigured, a configuration switch may be provided which must be actuated to place the scanner in programming mode. Once the switch is actuated the scanner enters programming mode enabling the programming label 335 on the cable to be read and configure the scanner. The switch may be a hardware switch such as a dip switch 312 (see FIG. 14) on the housing of the scanner 310. Alternately, programming mode may be entered (and exited if desired) by a soft switch such as a switch label 337 located on the cable 320. Though the configuring bar code conveniently appears on the interconnect cable, configuration bar codes (i.e., the same bar code as appearing on the cable as well as additional bar codes) may nonetheless be provided in the user manual to allow the user to configure the peripheral as desired such as to specific user optional settings. Alternately, the programming label may be positioned on the host computer or terminal. Such a location may be less desirable since different scanners may be plugged into the same host, possibly requiring different programming labels. Alternately, the program switch label may be positioned on the host as shown by the label 342 on the host 340 of FIG. 14. The user would then scan the label 342 to switch to programming mode and then scan the programming label 335 on the cable 320.

Configuration on the basis of the encoded data instructions obtained by reading the label or bar code 335 may be accomplished by a suitable internal configuration routine. For example, the routine may configure by way of selecting proper internal switch settings or by selecting and running a given protocol program. The data reader preferably stores its configuration parameters in a non-volatile programmable memory such as EEPROM. These parameters may be set by manual programming or reset by the configuration routine. The instructions from the label may cause the software in the data reader to execute a series of commands resulting in the setting (or resetting) of the EEPROM-stored parameters.

Configuration selection or parameters change or set a particular function for the peripheral. Possible configuration selections or parameters may include, by way of example for a handheld scanner:

interface identification (for a laser scanner, may include Undecoded, IBM 4683, OCIA, RS-232, Wand Emulation, etc.);

communication parameters such as baud rate (2400 baud, 9600 baud etc.); data format settings (parity, stop bits, data bits), hardware handshaking (CTS/RTS), software handshaking (Xon,Xoff), intercharacter delay (none, 10 ms, 20 ms etc.), UPC Data Format (UPA-A, UPC-E, Check Digit, Number System Digit);

system specific parameters (prefixes, suffixes, symbology identifiers, etc.);

reading restrictions, the instructions might restrict the set of codes options that the decoder may have to handle; by restricting the reading options, the operation speed of the "autodiscrimination" algorithm (the means by which the decoder figures out which code it is seeing) may be increased as compared to requiring the algorithm to consider all code types.

The preferred actual location on the cable for the encoded label will depend upon the particular application. Referring to FIG. 5 for example, the label 135 is located adjacent the second end connector. An alternate location is directly on the second end connector 124 as shown by symbol label 133 on end connector 124. If the second end connector 124 is too small to practically accommodate the label 133 or if the connection location to the data terminal 140 provides inconvenient access, the label 135 may preferably be located up the cable connector 120 at a suitable distance from the second end connector 124. In general, it is impractical to locate the label 135 on the first end connector 122 or immediately adjacent thereto because when the first end connector 122 is plugged into the scanner 155, the scanner 155 cannot be oriented to scan a label located immediately adjacent the first end connector 122.

Nonetheless, in certain applications it may be desirable to locate the label 135 near the first end connector 122. If the connector cable 120 is relatively long, for example 50 feet (15 meters), the label may be preferably positioned about 2 feet (60 cm) from the first end connector 122. Such a position is close enough to be easily located but far enough to allow convenient access. Such a location is illustrated in FIG. 14 where the bar code label 335 is located on the cable 320 at a convenient distance from scanner 310.

Figure 15:
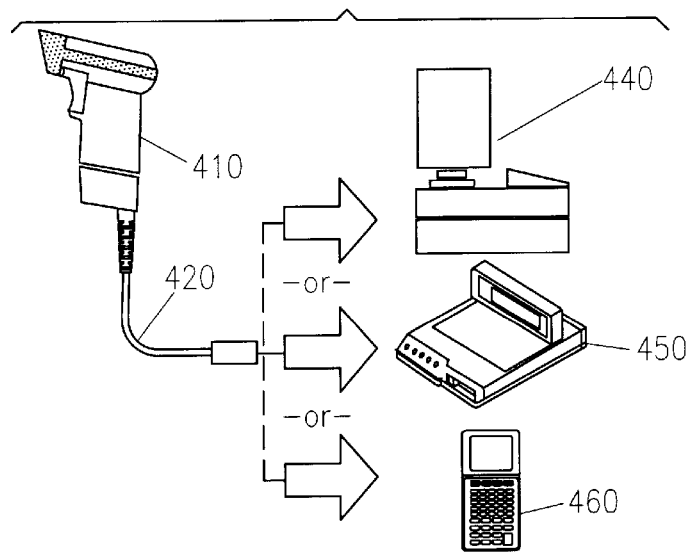
FIG. 15 illustrates various peripheral/host pairs.

Though the cable connector configuration embodiment and the cable connector data reader configuration embodiment may be used separately to configure the peripheral, the embodiments may be combined together to provide a comprehensive and readily implemented configuration procedure. By way of example, FIG. 15 illustrates a peripheral shown as a laser scanner 410 is equipped with a multi-interface architecture which allows any one of many different types of host interfaces (such as a data terminal 440, a fixed scanner or other point of sale unit 450, or a handheld key entry unit 460) to be selected for a particular scanner. A cable 420 is selected corresponding to the particular scanner 410 and the desired host interface (440, 450, 460) pair. In practice, the user is supplied with a plurality of specific connector cables which correspond to the possible scanner/host pairs which the customer may have.

When plugged into the scanner, the cable 420 itself selects a certain configuration scheme in the scanner 410. The cable 420 may also configure the host interface. The cable 420 may be equipped with physical connector elements to ensure that only the correct cable may be even physically plugged into the host. Once plugged into the scanner and the host, using the scanner itself, the operator then scans the label on the cable which completes or confirms scanner/host configuration.

Besides the bar code label, there are other types of labels or tags containing information which may be obtained by a reader device. One such label or tag is an RFID tag (radio frequency identification tag). The RFID tag is normally passive, but when activated or prompted by a signal from a interrogator, the RFID tag emits a signal with its information to a receiving device. In one alternative embodiment, the cable 320 may include a label 336 comprising an RFID tag instead of a bar code. The scanner 310 may comprise an RFID tag interragtor/receiver (either exclusively or in combination with a bar code scanning mechanism) which prompts the RFID tag 336 for its data and receives the data. The data is then used to set internal configuration, function or the like. The programming RFID tag process may be initiated for example by actuating the programming switch 312 on the device 310. Alternately, programming may be automatically initiated upon power up or power down of the device 310. In the power up example, when the device is powered up, the programming frequency signal would be emitted and upon receipt the RFID tag would emit its signal transmitting programming data to the device. Such a system would not require the user to perform any act except plug in the correct cable and turn on the data reader and the data reader itself would obtain the proper configuration information (for example) from the RFID tag on the cable and in this example configure itself for the host device such as by selecting the proper internal parameter.

An RFID programming tag 343 may alternately be located on the host device itself. By activating the programming sequence, the device 310 may receive the data from the tag 343 identifying the host device 340 allowing the peripheral device to be configured for that host device.

Thus, a peripheral configuration system and method have been shown and described. Though certain examples and advantages have been disclosed, further advantages and modifications may become obvious to one skilled in the art from the disclosures herein. The invention therefore is not to be limited except in the spirit of the claims that follow.

We claim:

1. A method for configuring a bar code scanning system for a given application, the bar code scanning system being comprised of a scanner and an interconnect cable, comprising the steps of:

(1) identifying the scanner;
   (2) identifying the given application for which the bar code scanning system will be used;
   (3) selecting a correct interconnect cable by identifying an interconnect cable corresponding to the scanner and the given application identified in steps (1) and (2);
   (4) connecting the interconnect cable selected in step (3) to the scanner and the host;
   (5) providing a bar code label with the interconnect cable, the bar code label instructions for selection of interface configuration parameters for the bar code scanning system;
   (6) reading the bar code label with the scanner to obtain the instructions;
   (7) configuring the bar code scanning system for the given application by selecting proper internal parameter settings on the basis of the instructions.

2. A method for configuring a bar code scanning system for a given application, the bar code scanning system being comprised of a scanner and an interconnect cable, comprising the steps of (1) identifying the scanner;
   (2) identifying the given application for which the bar code scanning system will be used;
   (3) selecting a correct interconnect cable by identifying an interconnect cable corresponding to the scanner and the given application identified in steps (1) and (2);
   (4) configuring the bar code scanning system by connecting the interconnect cable selected in step (3) to the scanner and the host.

3. A method according to claim 2 wherein the step of selecting the correct interconnect cable comprises selecting an interconnect cable having an identifying code imprinted thereon corresponding to the scanner and the given application identified in steps (1) and (2).

4. A method according to claim 2 further comprising (5) providing a bar code label with the interconnect cable, the label containing encoded data comprising instructions for selection of interface configuration parameters for the bar code scanning system;

(6) using the scanner to obtain the encoded data;

(7) processing the encoded data;

(8) by means of an internal configuration routine, configuring the bar code scanning system for the given application by selecting proper internal parameter settings on the basis of the instructions from the encoded data.

5. A method according to claim 4 wherein the bar code scanner comprises a laser scanner.

6. A method of setting interface configuration of a data reading system for a given host type, comprising the steps of selecting an interconnect cable corresponding to the given host type;

providing a bar code label with the interconnect cable, the bar code label containing encoded data comprising instructions corresponding to the given host type;

scanning the bar code label to obtain the encoded data contained in the label;

setting interface configuration of the data reading system on the basis of the instructions from the encoded data.

7. A method according to claim 6 wherein the given host type comprises a data terminal.

8. A method according to claim 6 wherein the given host type comprises a communications module.

9. A method according to claim 8 wherein the communications module comprises an RF transmitter.

10. A method according to claim 6 wherein the given host type comprises a point of sale unit.

11. A method according to claim 6 wherein the given host type comprises a wedge.

12. A method according to claim 6 further comprising placing the bar code label on a tag associated with the interconnect cable.

13. A method according to claim 6 further comprising imprinting the bar code label directly on the interconnect cable.

14. A method according to claim 6 wherein the interconnect cable includes a printed circuit board.

15. A method according to claim 6 wherein the step of setting the interface configuration comprises setting system parameters corresponding to an interface type selected from the group consisting of: IBM 4683, OCIA, RS-232, Wand Emulation.

16. A bar code scanning system comprising a scanner; and an interconnect cable detachably connectable to the scanner, the interconnect cable being removable by being connecting to and being disconnected from the scanner wherein hardware and/or firmware of the bar code scanning system is automatically configured to interface with a given host by selecting an interconnect cable corresponding to the given host and connecting the interconnect cable to the scanner.

17. A system according to claim 16 wherein the interconnect cable includes a switch for changing configuration of the interconnect cable.

18. A system according to claim 16 wherein the interconnect cable includes a printed circuit board.

19. A system according to claim 18 the printed circuit board includes switches for changing internal settings of the interconnect cable.

20. A system according to claim 16 further comprising an identifying code located on an outer surface of the interconnect cable, the identifying code corresponding to a particular host or class of hosts to which the interconnect cable corresponds.

21. A system according to claim 16 wherein the interconnect cable includes a first end for connection to the scanner and a second end, the second end including a multiple contact connector constructed and arranged to be properly physically connectable only to given host or similar class of hosts.

22. A data reading system, comprising a data reader and an interconnect cable detachably connectable to the data reader, the interconnect cable being removable by being connecting to and being disconnected from the data reader wherein interface configuration of the data reading system is changeable to correspond with a given host by changing the interconnect cable and connecting the interconnect cable to the data reader.

23. A data reading system comprising a data reader;

an interconnect cable detachably connectable to the data reader;

a bar code label associated with the interconnect cable, the label containing encoded data comprising instructions for selection of interface configuration parameters for the data reading system;

internal circuitry for setting interface configuration parameters of the data reading system, wherein the data reading system is set to a given interface configuration by reading the bar code label associated with the interconnect cable.

24. A data reading system according to claim 23 wherein the interface configuration is selected from the group consisting of:

IBM 4683, OCIA, RS-232, Wand Emulation.

25. A data reading system according to claim 24 further comprising a data terminal connected to the data reader via the interconnect cable.

26. A data reading system comprising a scanner;

an interconnect cable detachably connectable to the scanner;

a bar code label associated with the interconnect cable, the label containing encoded data comprising instructions for selection of interface configuration parameters for the data reading system;

internal circuitry for setting interface configuration parameters of the data reading system, wherein the data reading system is set to a given interface type by connecting the interconnect cable to the scanner and scanning the bar code label associated with the interconnect cable.

27. A data reading system according to claim 26 wherein the interface type is selected from the group consisting of:

Undecoded, IBM 4683, OCIA, RS-232, Wand Emulation.

28. A data reading system according to claim 26 further comprising an RF communications module connected to the scanner via the interconnect cable.

29. A connector cable system according to claim 28 further comprising an identifying code located on an outer surface of the interconnect cable, the identifying code corresponding to the given host.

30. A connector cable system according to claim 28 wherein the interconnect cable comprises a switch for changing a function of the interconnect cable.

31. A connector cable system according to claim 28 wherein the interconnect cable comprises a printed circuit.

32. A connector cable system according to claim 28 wherein the programming label in imprinted on a tag attached to the interconnect cable.

33. A connector cable system for providing interface configuration of a data reading system having a data reader and an interconnect cable, comprising an interconnect cable having a first end connector connectable to the data reader and a second end connector connectable to a given host;

a unique programming label provided with the interconnect cable having configuration data encoded thereon, the configuration data comprising information readable by the data reader to configure the data reading system to an interface corresponding to the given host.

34. A method for configuring a scanning system for a host, comprising the steps of (1) identifying the scanning system;
(2) identifying a given host for which the scanning system will be used;
(3) configuring the scanning system for the given host by the steps of:
   (a) selecting a correct interconnect cable by identifying an interconnect cable corresponding to the scanning system and the given host identified in steps (1) and (2),
   (b) connecting the interconnect cable selected in step (3)(a) to the scanning system and the host, wherein connection of the interconnect cable sets internal configuration parameters of the scanning system.

35. A method according to claim 34 wherein the step of configuring the scanning system further comprises
   (c) providing a label containing configuration information,
   (d) reading the label with the scanning system to obtain the information,
   (e) setting internal configuration parameters on the basis of the information.

36. A method according to claim 34 wherein the scanning system comprises a handheld bar code laser scanner.

37. A method according to claim 34 further comprising setting the interface configuration of the scanning system for a given host type, wherein the given host type comprises a data terminal.

38. A method according to claim 34 further comprising setting the interface configuration of the scanning system for a given host type, wherein the given host type comprises a communications module.

39. A method according to claim 38 wherein the communications module comprises an RF transmitter.

40. A method according to claim 34 further comprising setting the interface configuration of the scanning system for a given host type, wherein the given host type comprises a point of sale unit.

41. A method according to claim 34 further comprising setting the interface configuration of the scanning system for a given host type, wherein the given host type comprises a wedge.

42. A method for setting interface configuration of a scanning system, comprising the steps of (1) identifying the scanning system;
(2) identifying a desired interface configuration for which the scanning system will be used;
(3) identifying an interconnect cable corresponding to the scanning system and the interface configuration identified in steps (1) and (2);
(4) setting switches of the interconnect cable corresponding to the desired interface configuration; and
(5) connecting the interconnect cable to the scanning system.

43. A method according to claim 42 further comprising
(6) providing a label, the label containing encoded data comprising instructions for selection of configuration parameters for the scanning system;
(7) using the scanning system to obtain the encoded data;
(8) processing the encoded data;
(9) by means of an internal configuration routine, completing configuration the scanning system for the given application by selecting proper internal parameter settings on the basis of the instructions from the encoded data.

44. A method according to claim 43 further comprising placing the bar code label on a tag associated with the interconnect cable.

45. A method according to claim 43 further comprising imprinting the bar code label directly on the interconnect cable.

46. A method according to claim 42 wherein the interconnect cable includes a printed circuit board.

47. A method according to claim 42 wherein the step of setting the interface configuration comprises setting system parameters corresponding to an interface type selected from the group consisting of: IBM 4683, OCIA, RS-232, Wand Emulation.

48. A bar code scanning system comprising:
an interconnect cable detachably connectable to the scanning system, the interconnect cable being removable by being connected to and being disconnected from the scanning system, the interconnect cable including a first end connector for connection to the scanning system, the first end connector having a plurality of pin connections wherein at least two of the pin connections are interconnected;
wherein hardware and/or firmware of the scanning system is automatically configured to interface with a given host by selecting an interconnect cable corresponding to the given host and connecting the interconnect cable to the scanning system.

49. A system according to claim 48 wherein the scanning system comprises a laser bar code scanner, the interconnect cable being directly connected to the scanner, the interconnect cable including a switch for changing configuration of the interconnect cable.

50. A system according to claim 48 wherein the interconnect cable includes a printed circuit board.

51. A system according to claim 48 wherein the interconnect cable includes a printed circuit board having switches for changing internal settings of the interconnect cable.

52. A system according to claim 48 further comprising an identifying code located on an outer surface of the interconnect cable, the identifying code corresponding to a particular host or class of hosts to which the interconnect cable corresponds.

53. A system according to claim 48 wherein the interconnect cable includes a first end for connection to the scanner and a second end, the second end including a multiple contact connector constructed and arranged to be properly physically connectable only to given host or similar class of hosts.

54. An interface configuration system for a scanning system, comprising
an interconnect cable detachably connectable to the scanning system, the interconnect cable being removable by being connected to and being disconnected from the scanning system, the interconnect cable including a first end connector, the first end connector having a plurality of pin connections wherein interface configuration of the scanning system is effected by interconnecting at least two of the pin connections via connection of the first end connector.

55. An interface configuration system for a scanning system, comprising an interconnect cable detachably connectable to the scanning system, the interconnect cable being removable by being connected to and being disconnected from the scanning system, the interconnect cable including a first end connector, the first end connector having a plurality of pin connections wherein interface configuration is accomplished within the scanning system by interconnecting at least two of the pin connections, wherein hardware and/or firmware of the scanning system is automatically configured to interface with a given host by selecting an interconnect cable corresponding to the given host and connecting the interconnect cable to the scanning system.

56. An electronic device having a changeable interface configuration, comprising hardware and/or firmware which is configurable to at least two different interface configurations;

a connector which is connectable to an interconnect cable, the connector having a plurality of electrical contacts wherein interface configuration is selected by interconnecting at least two of the electrical contacts.

57. An electronic device according to claim 56 wherein the electrical contacts are selected from the group consisting of: edge connectors, pin connectors, plug connectors.

58. An electronic device according to claim 56 wherein the electrical contacts are interconnected by attachment of the interconnect cable to the connector.

59. An electronic device according to claim 56 wherein the device is automatically configured to interface with a given host by selecting an interconnect cable corresponding to the given host and plugging the interconnect cable to the device.

60. A data reading system having internal hardware and/or firmware which is configurable to at least two different interface configurations and in which an interconnect cable is detachably connectable to the data reading system, the interconnect cable being removable by being connecting to and being disconnected from the data reading system wherein interface configuration of the data reading system is set to correspond to a selected one of the least two different interface configurations by connecting a selected interconnect cable and connecting the interconnect cable to the data reader.

61. A data reading system in which an interconnect cable is detachably connectable to the data reading system, the interconnect cable being removable by being connecting to and being disconnected from the data reading system wherein interface configuration of the data reading system is set to correspond with a given host by selecting a selected interconnect cable and connecting the interconnect cable to the data reader, the data reading system, further comprising internal hardware and/or firmware which is configurable to at least two different interface configurations;

a connector which is connectable to an interconnect cable, the connector having a plurality of pins wherein interface configuration is selected by interconnecting at least two of the pins via attachment of the interconnect cable.

62. A data reading system comprising a data reader;

a connector having a plurality of pin connections;

an interconnect cable for attachment to the connector, the interconnect cable including switches and a printed circuit board;

internal circuitry for setting interface configuration parameters of the data reading system, wherein the internal circuitry recognizes closing of an electrical connection between at least two of said pin connections and in response sets configuration of the data reading system to a given interface configuration.

63. A data reading system according to claim 62 wherein the interface configuration is selected from the group consisting of: IBM 4683, OCIA, RS-232, Wand Emulation.

64. A data reading system according to claim 62 further comprising a data terminal connected to the data reader via the interconnect cable.

65. A data reading system according to claim 62 further comprising an RF communications module connected to the data reader.

66. A data reading system according to claim 62 further comprising a unique programming label having configuration data encoded thereon, the configuration data comprising information readable by the data reader to further configure the data reading system to an interface configuration.

67. A connector cable system according to claim 62 wherein the interconnect cable comprises a switch for changing a function of the interconnect cable.

68. A connector cable system according to claim 62 wherein the interconnect cable comprises a printed circuit.

69. A connector cable system according to claim 62 wherein the interconnect cable comprises a radio frequency link.

70. A data reading system comprising a data reader;

a connector on the data reader;

an interconnect cable for attachment to the connector, the interconnect cable including a printed circuit board having multiple settings corresponding to different interface configurations;

internalcircuitry for setting interface configuration parameters of the data reading system, wherein configuration of the data reading system is set to a given interface configuration at least in part by switching settings within the printed circuit board.

71. A method of configuring a data reading system for a given interface configuration, the data reading system including a data reader, comprising the steps of identifying the data reader;

selecting an interconnect cable corresponding to the data reader;

providing the interconnect cable with a printed circuit board, the printed circuit board having multiple settings corresponding to different interface configuration settings;

selecting interface configuration by changing settings of the printed circuit board and connecting the interconnect cable to the data reader.

72. A method according to claim 71 wherein changing settings of the printed circuit board comprises setting manual switches located on the printed circuit board.

73. A method according to claim 71 further comprising providing a label with information encoded thereon corresponding to configuration data;

reading the label with the data reader to obtain the configuration data;

using the configuration data to complete interface configuration of the data reading system.

74. A method according to claim 71 wherein setting the configuration further comprises reading a label and changing settings.

75. A method of configuring a data reading system for a given interface configuration comprising the steps of providing a plurality of interconnect cables, each being plug compatible with the data reader;

selecting a given interconnect cable from the plurality of interconnect cables corresponding to the given interface configuration;

connecting the given interconnect cable to the data reader;

providing the data reading system with control circuitry which recognizes the given interconnect cable and in response configures the data reading system to the given interface configuration.

76. A method of configuring a data reading system for a given interface configuration comprising the steps of providing a plurality of interconnect cables, each being plug compatible with the data reader;

selecting a given interconnect cable from the plurality of interconnect cables corresponding to the given interface configuration;

connecting the given interconnect cable to the data reader;

providing the given interconnect cable with a printed circuit board, the printed circuit board having multiple settings corresponding to different interface configuration settings;

changing settings of the printed circuit board to correspond to the given interface configuration.

* * * * *